United States Patent [19]

Sherif

[11] Patent Number: 5,047,174

[45] Date of Patent: Sep. 10, 1991

[54] PRODUCTION OF STABLE METAL OXIDE SOLS

[75] Inventor: Fawzy G. Sherif, Stony Point, N.Y.

[73] Assignee: Akzo America Inc., New York, N.Y.

[21] Appl. No.: 273,768

[22] Filed: Nov. 21, 1988

[51] Int. Cl.$^5$ .................... B01J 13/00; G01G 23/04; G01G 25/02

[52] U.S. Cl. .................................. 252/309; 106/450; 501/1; 501/12; 501/103; 501/134; 501/152; 423/608; 423/609; 423/610; 423/335; 423/592; 252/315.6; 252/314

[58] Field of Search ................ 252/309, 314; 106/450; 501/12; 423/608, 609, 610

[56] References Cited

U.S. PATENT DOCUMENTS

| | | | |
|---|---|---|---|
| 1,906,149 | 4/1933 | Gardner | 106/450 X |
| 3,312,630 | 4/1967 | Vanik et al. | 252/309 |
| 3,625,856 | 12/1971 | Schaefer | 252/309 |
| 4,543,341 | 9/1985 | Barringer et al. | 501/1 |
| 4,770,813 | 9/1988 | Watanabe et al. | 252/309 |

OTHER PUBLICATIONS

Fegley et al., "Processing and Characterization of $ZrO_2$ and Y-Doped $ZrO_2$ Powders", *Ceramic Bulletin*, vol. 64, No. 8, 1985.

Chandra, "Qualitative and Kinetic Study...", *Ceramic Bulletin*, vol. 64, No. 8, 1985.

Derwent Abs. #87-154033/22 of JP-232592, Sumitomo Metal Mining KK (18.10.85).

Derwent Abs. #87-318085/45 of JP-070052, Sumitomo Metal Mining KK (28.03.86).

*Primary Examiner*—Richard D. Lovering
*Assistant Examiner*—John M. Covert
*Attorney, Agent, or Firm*—Richard P. Fennelly; Louis A. Morris

[57] ABSTRACT

Stable metal oxide sols comprising an anhydrous alcohol having metal oxide particles colloidally dispersed therein is disclosed. This sol composition is formed by the hydrolysis of a metal alkoxide to form metal oxide particles, removal of the particles from the resulting mother liquor from such a reaction, and the redispersing of the metal oxide powders in an anhydrous alcohol solvent.

6 Claims, No Drawings

PRODUCTION OF STABLE METAL OXIDE SOLS

BACKGROUND OF THE INVENTION

1. Field of the Invention

The present invention relates to the production of stable metal oxide sols which can be used for forming metal oxide coatings on substrates.

2. Description of the Prior Art

The instant invention relates to the preparation of stable metal oxide sols using metal alkoxides as a starting material.

It is known that metal alkoxides can be hydrolyzed to form metal oxides, and the metal oxide precipitates can be recovered as powders. An example of such a procedure is shown in U.S. Pat. No. 4,543,341 to E. A. Barringer et al. It is well known that in this type of procedure, in which a metal alkoxide is hydrolyzed to form a metal oxide powder, problems of agglomeration can occur (see "Processing and Characterization of $ZrO_2$ and Y-Doped $ZrO_2$ Powders", Bruce Fegley, Jr. et al., American Ceramics Society Bulletin, Vol. 64, No. 8, pp. 1115-1120 (1985)). Examples of foreign patent applications which relate to the production of zirconium oxide powders by the hydrolysis of zirconium alkoxide and alcohol with the eventual growth of the resulting particles are Japanese Patent Publication Nos. 62/91,421 and 62/226,816.

SUMMARY OF THE PRESENT INVENTION

The present invention relates to the formation of stable metal oxide sols comprising an anhydrous alcohol solvent containing metal oxide particles colloidally dispersed therein. The invention also relates to a process for making such sol compositions which comprises adding water to a metal alkoxide solution to cause hydrolysis of the alkoxide with the formation of the corresponding metal oxide solids, removing the water remaining in contact with the solids contained therein, and redispersing the metal oxide solids in an anhydrous alcohol solvent to form the desired sol.

The first step in forming the stable metal oxide sols of the present invention comprises the hydrolysis of a suitable metal alkoxide solution to cause the formation of the desired metal oxide solids. The types of alkoxides which can be treated in accordance with the present invention include those of the transition metals of Groups IB to VIIB and VIII of the Periodic Table as well as the metals of Groups IIA and IIIA. The Condensed Chemical Dictionary, Ninth Edition, contains a representation of the Periodic Table on page 662 thereof. Representative examples include the alkoxides of zirconium, yttrium, aluminum, titanium, magnesium, cerium, calcium, strontium, barium, silicon, and mixtures thereof. The number of carbon atoms in the organo ligand of the alkoxide can generally range from 1 to 6, e.g., $C_1$ to $C_6$ alkyl.

The hydrolysis of the alkoxide is preferably carried out in the presence of an alcohol solvent. Representative alcohols contain anywhere from about 1 to 6 carbon atoms, such as methanol, ethanol, n-propanol, isopropanol, methoxypropanol, ethoxypropanol, and the like. Generally speaking, the amount of water used will range anywhere from about 5% to about 50%, by weight, of the amount of alkoxide employed, depending upon the valency of the metal in the alkoxide.

The hydrolysis reaction is generally known and will result in the formation of metal oxide particles in solution. It is critical to the instant invention that the mother liquor, containing water, remaining after the hydrolysis reaction be removed from the resulting metal oxide particles within a few hours after the reaction has taken place. Generally speaking, it is contemplated the mother liquor be removed within about 0.1 hour to about four hours. If the metal oxide particles are kept in contact with the mother liquor for longer periods of time (e.g., from about six to twenty-four hours), the particles will agglomerate and sol formation by dispersion, as described below, will not occur. One way of accomplishing such a removal of the particles is to separate them from the mother liquor by centrifugal force. After removal from the mother liquor, the desired metal oxide particles can be dispersed (e.g., by ultrasonic agitation) in an anhydrous alcohol to form a colloidal dispersion of the particles in the alcohol and give the desired sol composition of the present invention. Preferably, the alcohols used should be highly volatile liquids suitable for fast evaporation during coating operations using the resulting compositions. Generally speaking, the $C_1-C_6$ alcohols described before for presence during the hydrolysis reaction can be selected as the anhydrous alcohol for dispersion of the metal oxide particles.

The sol compositions of the present invention are stable for extended periods of time. Sols were observed to be stable in the laboratory for up to six months without settlement of the particles. After six months, the settled particles could be redispersed into a uniform sol by gentle shaking. This allows for a long shelf-life for such products which find utility as compositions that can be used in forming coatings of the metal oxides on a desired substrate. Once such a coating has been formed, it is very easy to heat the combination of substrate and coating to remove the alcohol solvent therefrom leaving behind the metal oxide particles on the substrate. Appropriate further heating and firing of the metal oxide coated substrate can yield ceramic coatings thereon.

The present invention is further illustrated by the Examples which follow.

EXAMPLE 1

Zirconium n-butoxide.1 butanol (171.6 gm) was mixed with 125 ml of n-propanol and placed in a one liter, three-neck round-bottom flask under nitrogen atmosphere. The concentration of zirconium was 0.95 molar. A solution of 28.8 ml of deionized water in 125 ml of n-propanol was added through an addition funnel under nitrogen atmosphere to the solution in the flask with rapid stirring for two minutes. The stirring was stopped, and the mixture was left to stand for three hours. The mixture was then centrifuged, and the mother liquor was discarded. The solid residue was ultrasonically dispersed in 2-propanol and then centrifuged to harvest the supernatant sol. This procedure was repeated several times.

The total volume of sol was 2689 ml. It was found to be milky in appearance. Its concentration was 1.1% solids, by weight. The particle size distribution data for this supernatant yielded a median particle size of 0.11 micron using a Horiba Capa particle size analyzer. The yield of powder in the supernatant was found to be 29.6 gm, a yield of 53%, by drying aliquots to 120° C. for sixteen hours.

After two months the particle size distribution of the supernatant was reanalyzed to determine its stability. The median particle size was found to be 0.11 micron indicating that essentially no precipitation had occurred from solution.

The final residue was dried at 120° C. for twenty-four hours. The weight of the residue was 26.3 gm, a 47% yield. The particle size distribution data gave a median size of 2.9 microns.

COMPARATIVE EXAMPLE 2

This Example is similar to Example 1, except that the concentration of zirconium was 0.18 molar. In this dilute solution, the particle sizes of the particles in the formed slurry were large, median=2.8 microns. No stable sol was formed. The supernatant was clear after a few hours.

Zirconium n-butoxide 1 butanol (85.8 ml) was dissolved in 1000 ml of n-propanol. Water (14.4 ml) was then dissolved in 500 ml of n-propanol. The water was added rapidly to the alkoxide solution. The slurry that then formed was centrifuged, the mother liquor was discarded, and the supernatant was collected as in Example 1. The supernatant was not stable. After a few hours, solids separated out. The residue was dried, and it weighed 23.9 gm, a 68% yield. The median particle size of the solid was 1.9 microns.

The weight of the settled solids in the supernatant was found to be 11 gm, a 32% yield. This shows that when the original zirconium concentration was dilute, i.e., 0.18 molar, no stable supernatant sol was formed.

EXAMPLE 3

This Example was performed as in Example 1 to show the effect of water upon the agglomeration and stability characteristics of the zirconia sol. The residue after the separation of the mother liquor by centrifugation was divided into five portions. Each portion was ultrasonically dispersed in 130 cc of the following liquids:
1. butanol (the parent alcohol of the alkoxide);
2. butanol and n-propanol (mixture of parent alcohol and solvent used);
3. 2-propanol (extractant/dispersant);
4. original mother liquor (contains parent alcohol, n-propanol, and in situ water);
5. 2-propanol+0.5 wt % water (extractant/dispersant and water).

After ultrasonic dispersion and centrifugation, sols (milky liquids) were obtained for portions 1-3 but not for 4 or 5. This indicates that the in situ water or added water caused the undesirable agglomeration of the very fine particles. The agglomerates settled to the bottom giving a clear supernatant.

EXAMPLE 4

This Example demonstrates that the sol formed in Example 1 was stable after concentration ten times.

The procedure described in Example 1 was repeated. The collected sol contained 1 weight percent solids. The mean particle size was found to be 0.15 micron. The supernatant was then evaporated under vacuum using a rotary evaporator until the volume was reduced from 4000 ml. to 400 ml. The concentration was 10 weight percent solids. The mean particle size of the concentrated sol was found to be 0.15 micron. This indicated that no agglomeration had occurred. The concentrated supernatant was cloudy (milky) and stayed as such for two months without precipitation.

EXAMPLES 5-7

Additional experiments were conducted using the general procedure of Example 1 with the following results being obtained.

| Example No. | Zr Concentration (molar) Original | Zr Concentration (molar) Final | Molar Ratio ($H_2O/Zr$) |
| --- | --- | --- | --- |
| 5 | 1.35 | 0.89 | 2.66 |
| 6 | 0.95 | 0.57 | 4 |
| 7 | 0.6 | 0.33 | 4 |

The median particle size data (in microns) for the various compositions was as follows:

| Example No. | Reaction Slurry | Supernatant Zr Sol As is, 1% | Supernatant Zr Sol Conc., 10% | Supernatant Zr Sol at 120° C. |
| --- | --- | --- | --- | --- |
| 5 | — | — | 0.12 | 11 |
| 6 | 5.9 | 0.11 | 0.56 | 17 |
| 7 | 5.2 | 0.14 | 0.67 | 47 |

| Example No. | Sedimented $ZrO_2$ (Dried at 120° C.) |
| --- | --- |
| 5 | 8.4 |
| 6 | 2.6 |
| 7 | 20.0 |

Example 5 used less water to zirconium than Example 1, Example 6 had a lower final zirconium concentration than Example 1, and Example 7 had a lower original and final zirconium concentration than Example 1.

The foregoing Examples have been presented to illustrate certain embodiments of the present invention and should not be construed in a limiting sense. The scope of protection that is sought is set forth in the claims which follow.

I claim:

1. A process for forming stable metal oxide sols which comprises adding water to a Group IIA, Group IIIA, or transition metal alkoxide solution to cause hydrolysis of the alkoxide to form the corresponding metal oxide solids, separating the metal oxide solids from the water in contact therewith to prevent agglomeration of the solids, and redispersing the metal oxide in anhydrous alcohol for a time effective to form a stable sol.

2. A process as claimed in claim 1 wherein the metal oxide is a transition metal oxide.

3. A process as claimed in claim 1 wherein the metal oxide is an oxide of a metal of Groups IIA or IIIA of the Periodic Table.

4. A process as claimed in claim 1 wherein the hydrolysis is carried out in the presence of an alcohol solvent.

5. A process as claimed in claim 1 wherein the alcohol in which the metal oxide particles are dispersed is a $C_1$ to $C_6$ alcohol.

6. A process as claimed in claim 1 wherein the molar concentration of the metal alkoxide solution varies from about 0.2 to about 1.35.

* * * * *